United States Patent

Toomer

[15] 3,705,485
[45] Dec. 12, 1972

[54] DEVICE FOR USE IN PICKING BERRIES, AND THE LIKE

[72] Inventor: Charles H. Toomer, Elm Avenue, Berlin, N.J. 08009

[22] Filed: July 21, 1971

[21] Appl. No.: 164,620

[52] U.S. Cl. ..................................... 56/330, 56/339
[51] Int. Cl. ............................................. A01g 19/00
[58] Field of Search ............. 56/328 R, 330, 332–340

[56] References Cited

UNITED STATES PATENTS

| 432,362 | 7/1890 | Blackburn | 56/336 |
|---|---|---|---|
| 1,191,954 | 7/1916 | Elkins | 56/336 |
| 1,296,236 | 3/1919 | Uhlarick | 56/334 |
| 1,319,407 | 10/1919 | Martinez | 56/334 |
| 791,704 | 6/1905 | Lardner | 56/338 |
| 282,051 | 7/1883 | Castor | 56/340 |
| 441,971 | 12/1890 | Potterf | 56/340 |
| 1,240,128 | 9/1917 | Fellows | 56/340 |
| 2,943,432 | 7/1960 | Colon | 56/328 R |
| 1,170,960 | 2/1916 | Canterbury | 56/328 R |
| 700,165 | 5/1902 | Blydenburgh | 56/330 |

Primary Examiner—Russell R. Kinsey
Assistant Examiner—J. A. Oliff
Attorney—Robert K. Youtie

[57] ABSTRACT

A portable trough for collecting berries, and the like, having one end closed for location against a user with the other end extending away from the user, suspension means extending from the trough for engagement about the user, and a receiver on the other trough end for receiving engagement with a plant being picked.

4 Claims, 3 Drawing Figures

PATENTED DEC 12 1972

3,705,485

CHARLES H. TOOMER INVENTOR

BY Robert K. Goutie
ATTORNEY

DEVICE FOR USE IN PICKING BERRIES, AND THE LIKE

BACKGROUND OF THE INVENTION

While there have, in the past, been proposed a wide variety of portable collecting devices, as for berries and the like, such devices have not found general acceptance as being awkward and cumbersome to use, complex and difficult in operation, heavy to carry, and expensive to purchase and maintain.

SUMMARY OF THE INVENTION

It is, therefore, an important object of the present invention to provide a unique device for collecting berries, and the like, which overcomes the above-mentioned difficulties, is extremely convenient to use, greatly enhancing a user's picking efficiency and capacity, is extremely simple in construction for economy in manufacture, durability and reliability throughout a long useful life, and which is light in weight and comfortable to carry, so as to be highly desirable both to the user and employer.

While the device of the present invention has been primarily developed and employed for use in picking berries, and will be illustrated and described hereinafter with particular reference thereto, it is appreciated that the instant device is well adapted for utilization in a wide variety of harvesting operations, all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 2:
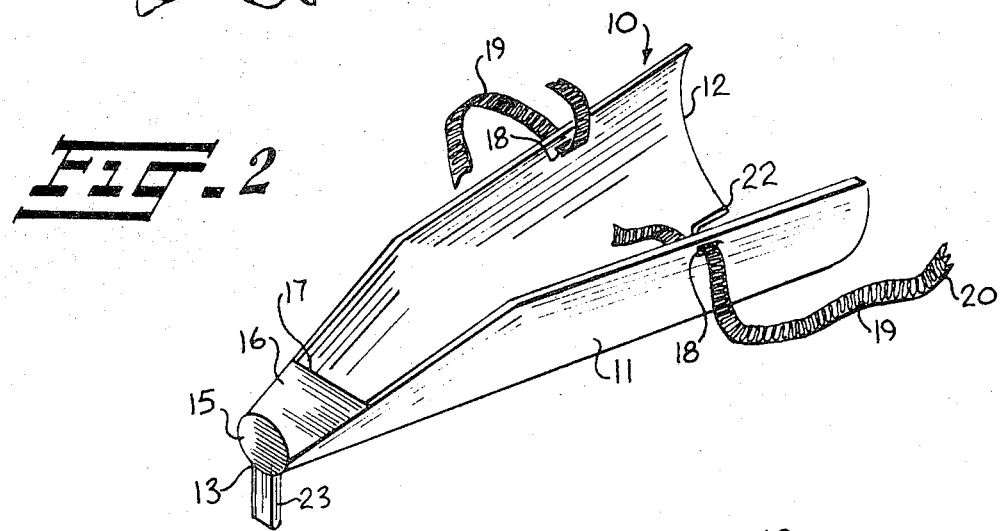
FIG. 2 is a perspective view showing the device of FIG. 1 apart from a user.
Figure 3:
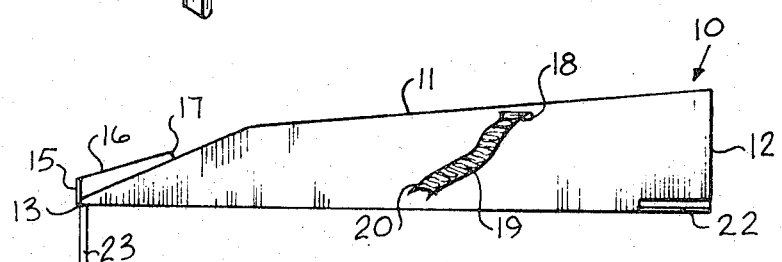
FIG. 3 is a side elevational view showing the device of FIG. 2.

Referring now more particularly to the drawings, and specifically to FIGS. 2 and 3 thereof, the berry picking device is there generally designated 10, and includes an elongate scoop or trough 11 having its upper side open, as shown in the drawings.

More particularly, the trough or scoop 11 may advantageously be formed from relatively light weight sheet metal, such as aluminum, but other suitable material may also be employed. The trough may be of generally arcuate cross-sectional configuration, having one end open, as at 12 and tapering from the latter end toward the other end 13. The latter end 13 is advantageously closed, as by an end wall 15. Further, the trough 11 has its end region adjacent to end 13 covered, as by a top wall or covering 16 extending laterally across the trough between the upper side edges thereof and the end wall 15. Thus, the smaller end region of the device 10 may be considered as defining a receptacle or pocket 17 opening longitudinally inwardly of the trough 11, all for a purpose appearing presently.

At a region of the elongate trough 11 spaced intermediate the trough ends, there may be provided on opposite sides of the trough suitable securing means, such as slots 18 for securement to the trough of opposite end portions 19 of a flexible suspension element or strap 20. The strap or suspension element 20 is best seen in FIG. 1 as having its end portions secured to respective sides of the trough 11, as through slots 18.

The larger end 12 of trough 11 remains open, and may be suitably provided with a branch receiver 22. The receiver 22 may advantageously be defined by a cutout or notch extending inwardly from the trough end 12, spaced laterally medially thereof.

Depending from the other end 13 of the trough 11 may be an extension or engaging member 23, such as a bar having one end fixedly secured to the trough and having its other end free of the trough.

Figure 1:
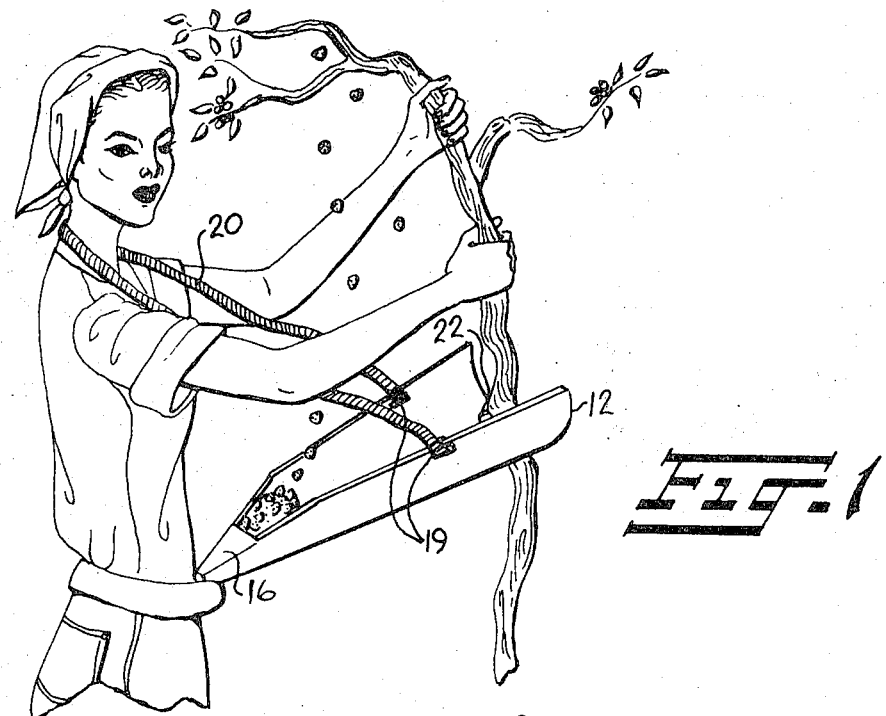
FIG. 1 is a perspective view illustrating a berry picking device of the present invention in an operative condition of use.

In use of the instant device, the smaller, closed trough end 13 is located adjacent to the person of a user, say adjacent to the user's waist as seen in FIG. 1, and the trough extends outwardly from the user. The engaging member or depending extension 23 may be frictionally engaged or inserted downwardly into the user's clothing, as within a user's waistband or belt. The flexible strap or loop 20 may be placed over the user's head so as to engage about the user's neck, also as seen in FIG. 1, to support the trough 11 in an outwardly and upwardly inclined relation to retain berries, or the like, in the pocket 17. It will be seen that this arrangement leaves the user's arms and hands completely free to perform necessary picking manipulations. Further, the receiver or notch 22 is adapted for receiving engagement with respect to a branch of a bush or plant to maintain the trough in proper position with respect to the bush. Following the picking of a desired quantity of berries and their collection in the trough 11, it is only necessary for the user to tilt the trough downwardly for discharging the picked berries into a container or "flat" for further processing.

Under certain circumstances the trough 11 may advantageously be fabricated of transparent material, as to afford visual access through the trough for surer footing and the like. Also, the trough may be fabricated of reticulated, perforated or screen material, as for visibility and to gravitationally pass dirt and other undesirable material.

From the foregoing, it is seen that the present invention provides a device for use in picking berries, and the like, which is extremely simple in construction, requiring no moving parts, so as to be reliable throughout a long useful life, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A device for use in picking berries and the like, said device comprising a generally semi-frusto-conical relatively stiff form retaining trough having one side open for carrying by a user with its open side facing upwardly, a closure on one end of said trough for placement against the person of the user with the other end away from the user, suspension means extending from said trough spaced from said one trough end for engagement about the neck of a user, an engaging member projecting downwardly from said one trough end for holding engagement in a user's s clothing a partial covering over said trough at said one trough end for retaining collected berries and the like with said trough extending upwardly and outwardly, and a receiver on said other trough end for receiving engagement with a plant being operated upon for firm endwise interposition between the plant and user.

2. A device according to claim 1, said receiver being defined by an outwardly opening notch in said other trough end for receiving a branch of a plant.

3. A device according to claim 1, said suspension means comprising a strap having opposite ends secured to opposite sides of said trough at a region spaced from said one trough end.

4. A device according to claim 3, said receiver being defined by an outwardly opening cutout in said other trough end for reception of a branch of a plant.

* * * * *